United States Patent [19]

Pelosi, III

[11] Patent Number: 5,314,377
[45] Date of Patent: May 24, 1994

[54] CLEAN AIR ISOLATION ENCLOSURE

[75] Inventor: Michael H. Pelosi, III, Birchrunville, Pa.

[73] Assignee: Airo Clean Inc., Exton, Pa.

[21] Appl. No.: 956,680

[22] Filed: Oct. 5, 1992

[51] Int. Cl.5 .............................................. F24F 7/007
[52] U.S. Cl. ..................................... 454/187; 135/93; 135/109; 454/228
[58] Field of Search ................. 135/93, 109; 454/187, 454/228, 230, 233, 234, 236, 296

[56] References Cited

U.S. PATENT DOCUMENTS

| | | | |
|---|---|---|---|
| 625,515 | 5/1899 | Palmer | 135/109 |
| 1,593,431 | 7/1926 | Buie | 135/109 X |
| 3,272,199 | 9/1966 | Matthews | 135/93 X |
| 3,505,989 | 4/1970 | Truhan | 454/187 X |
| 3,782,265 | 1/1974 | Pielkenrood et al. | 454/187 |
| 3,875,853 | 4/1975 | Pielkenrood | 454/187 |
| 3,892,170 | 7/1975 | Hazeley | 454/296 |
| 4,603,618 | 8/1986 | Soltis | 454/230 X |
| 4,667,580 | 5/1987 | Wetzel | 454/228 X |
| 4,731,461 | 3/1988 | Buha | 454/230 X |
| 4,854,224 | 8/1989 | Hirayama | 454/187 |

Primary Examiner—Harold Joyce
Attorney, Agent, or Firm—Eugene E. Renz, Jr.

[57] ABSTRACT

A portable clean air isolation enclosure which includes a collapsible enclosure, that has a top mounted inflatable plenum chamber, connected to a source of filtered air, and with peripheral curtains sealed at the bottom to the floor, to provide a positive or negative pressured sterile or dust free environment, which enclosure can be moved through normal doorways, set up and operated by one person.

6 Claims, 5 Drawing Sheets

CLEAN AIR ISOLATION ENCLOSURE

BACKGROUND OF THE INVENTION

1. Field of the Invention

This invention relates to an isolation enclosure of the portable, collapsible type, which can operate in a positive or negative pressure mode while maintaining low particle counts throughout the enclosure.

2. Description of the Prior Art

While clean air enclosures have been available for some time, the need for an enclosure that would be suitable for patient isolation in a hospital setting has become more acute. The cost of constructing and maintaining an isolation room in a hospital is high and it is often difficult to convert an existing room to an isolation room configuration. Therefore, it has been difficult to justify setting aside a number of rooms which are constructed as isolation rooms.

As of late the rise in communicable diseases such as tuberculous and HIV has greatly increased the need for a portable, easily assembled clean air enclosure which can convert an otherwise ordinary hospital room into an isolation area.

While a clean air Enclosure should isolate the rest of the room and personnel from the patient, it should also provide the patient with a pathogen or virus free environment. This environment is required, where for example, the patient has had a bone marrow transplant and must be protected. A typical enclosure which provides a clean environment is shown in the U.S. Patent to Michael H. Pelosi, Jr. et al U.S. Pat. No. 4,202,676 but this enclosure is not suitable for certain present requirements, since it is not large enough to house a hospital bed, nor is there visibility throughout 360° of the enclosure, nor is it capable of being set up and placed in operation by one person.

What are designated by others as portable clean rooms are available, but they require long set up times of at least four hours, require a number of persons for assembly, and are bulky and difficult to transport. It is desirable to have a clean air isolator that can be readily transported, and set up by one person, in minimum time, at isolated locations, and without separate sources of clean air.

The apparatus of the invention provides a clean air isolation enclosure with both positive and negative pressure modes, that can be transported and set up by one person, with multiple advantages not available with other structures.

SUMMARY OF THE INVENTION

A clean air isolation enclosure of the portable collapsible type, that can be moved to any desired location, set up and operated by one person, with a top mounted inflatable plenum, and peripheral curtains to provide a sterile, pathogen, virus and dust free environment, which does not require a separate air source or air return system, and can operate in a positive or negative pressure mode.

The principal object of the invention is to provide a clean air isolation enclosure which can operate in positive or negative air pressure modes, is portable, and does not require more than one person to transport and set up.

A further object of the invention is to provide a clean air isolation enclosure of the character aforesaid, which requires minimum assembly time.

A further object of the invention is to provide a clean air isolation enclosure of the character aforesaid, which can fit through standard 36 inch doorways and has minimum overhead clearance requirements.

A further object of the invention is to provide a clean air isolation enclosure of the character aforesaid, which can be linked with other like enclosures to provide a larger enclosure.

A further object of the invention is to provide a clean air isolation enclosure of the character aforesaid which has provisions for personnel to view the interior, and perform procedures therein while protecting the patients, and personnel outside the enclosure.

A further object of the invention is to provide a clean air isolation enclosure of the character aforesaid, which is large enough to contain a typical size hospital bed.

A further object of the invention is to provide a clean air enclosure of the character aforesaid, which has easy entry/exit characteristics, and which does not require a separate clean air source or return.

A further object of the invention is to provide a clean air isolation enclosure which distributes clean air with a minimum uniformity of +10% throughout the entire ceiling area, thereby sweeping every cubic inch of air in the enclosure downward and out.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

Figure 1:
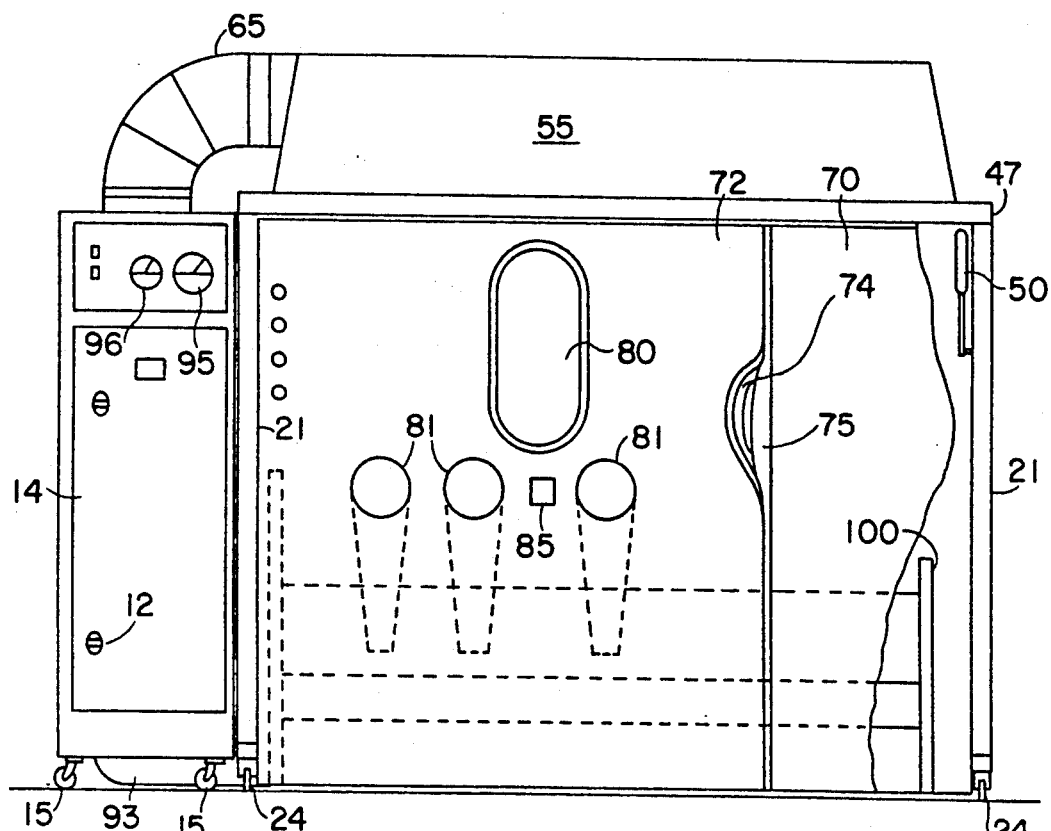
FIG. 1 is a front elevational view of the clean air enclosure of the invention.
Figure 6:
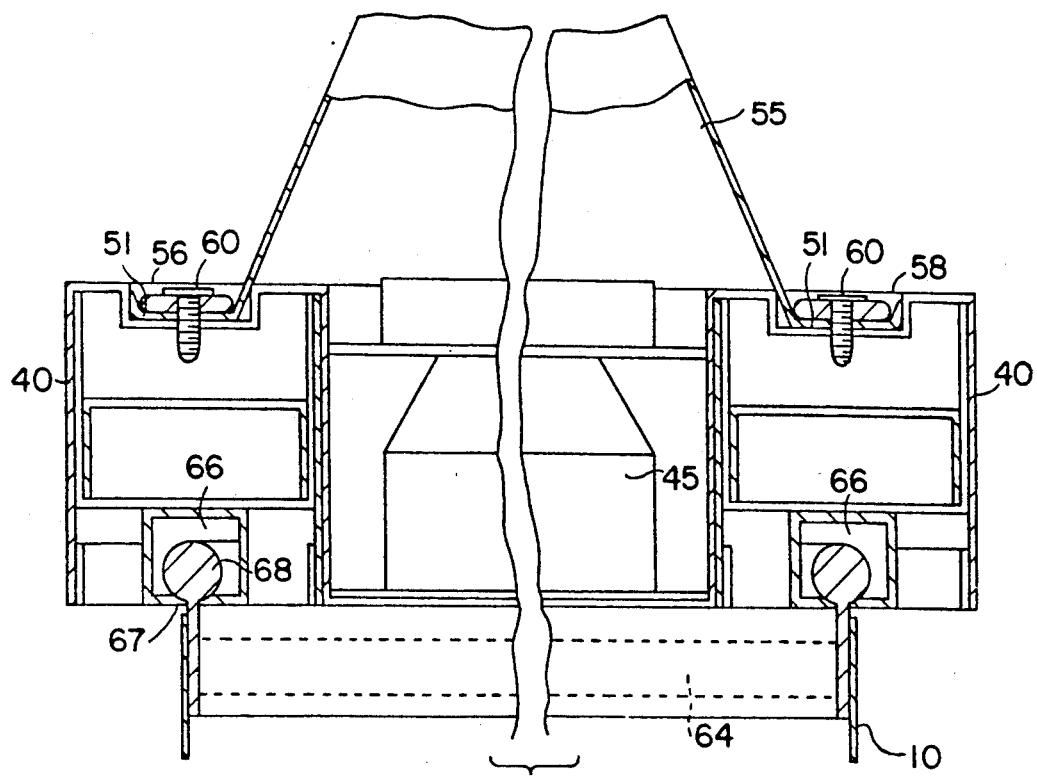
FIG. 6 is a fragmentary, vertical sectional view taken approximately on the line 6—6 of FIG. 5, illustrating the top portion of the clean air enclosure of FIG. 1.
Figure 2:
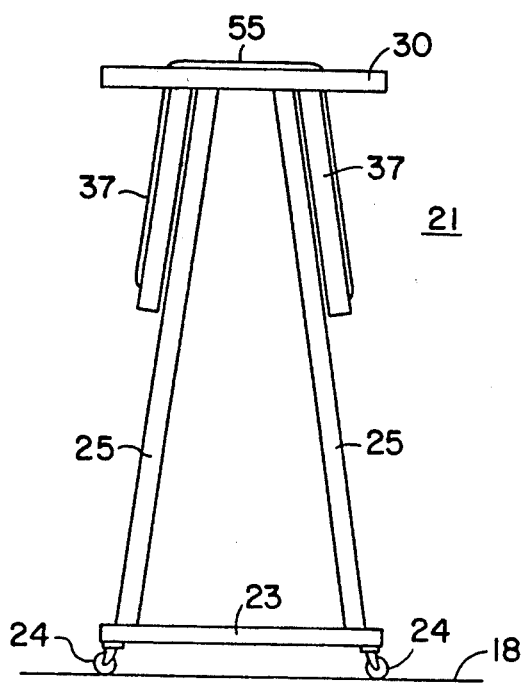
FIG. 2 is an end elevational view of a frame portion of the clean air enclosure of the invention, in collapsed condition.
Figure 3:
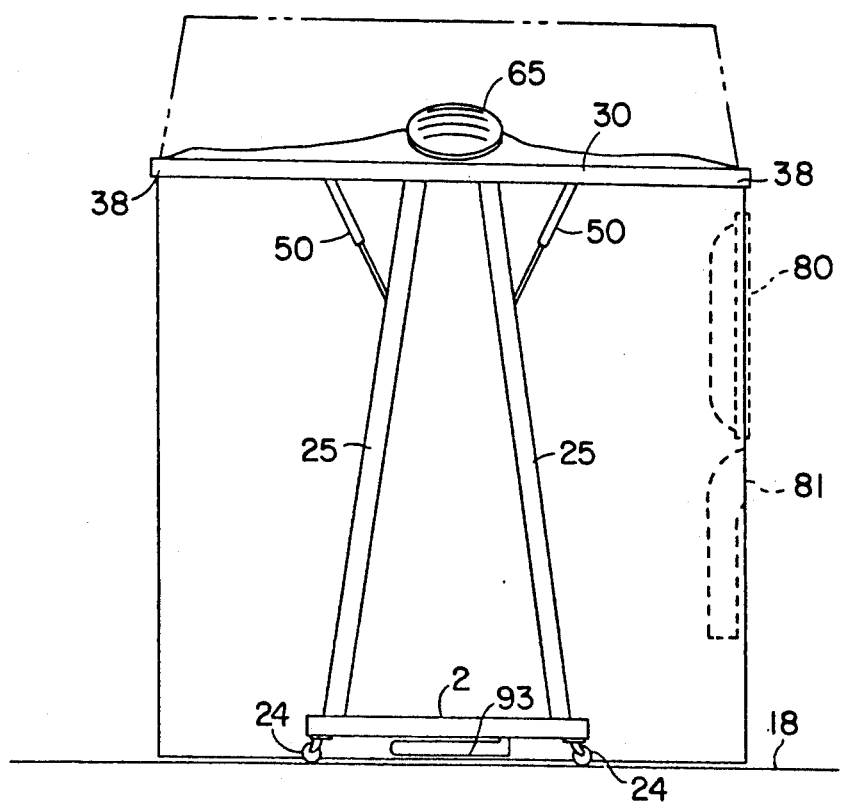
FIG. 3 is a fragmentary vertical sectional view, in assembled condition, and with portions thereof in phantom.
Figure 4:
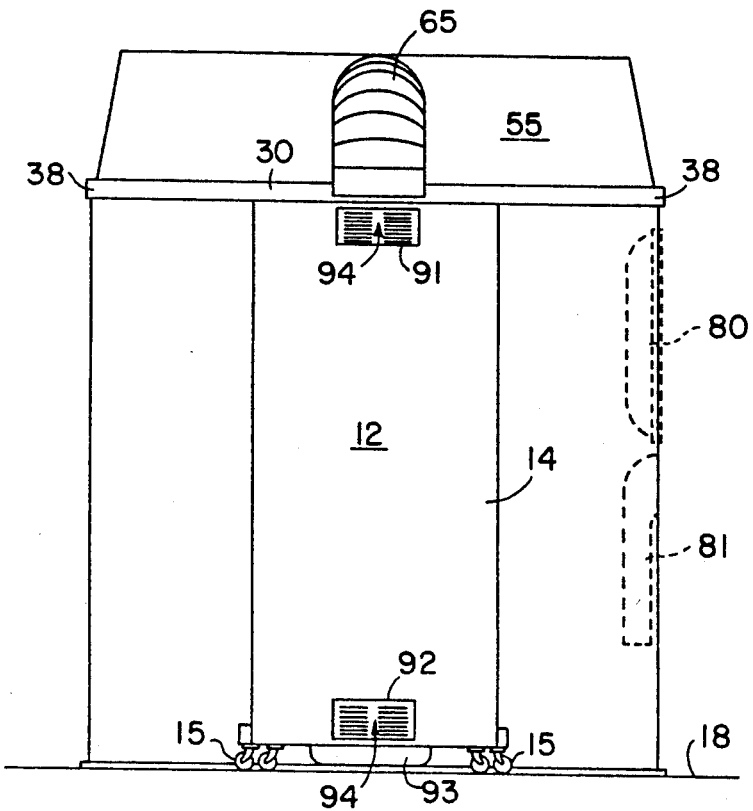
FIG. 4 is an end elevational view of the clean air enclosure of the invention.
Figure 8:
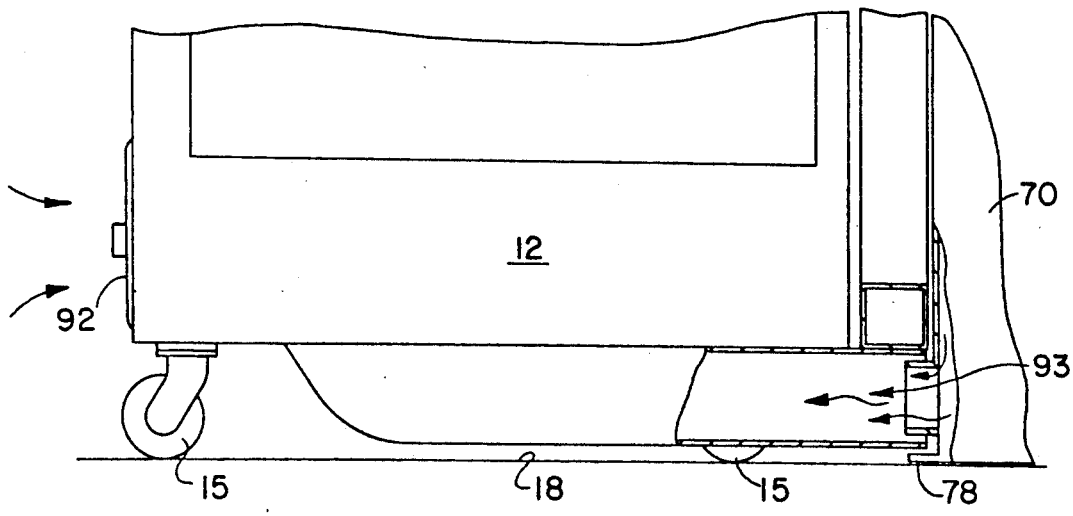
FIG. 8 is a fragmentary side elevational view, in partial section, of the air filtration and circulation portion of the clean air enclosure of the invention.
Figure 5:
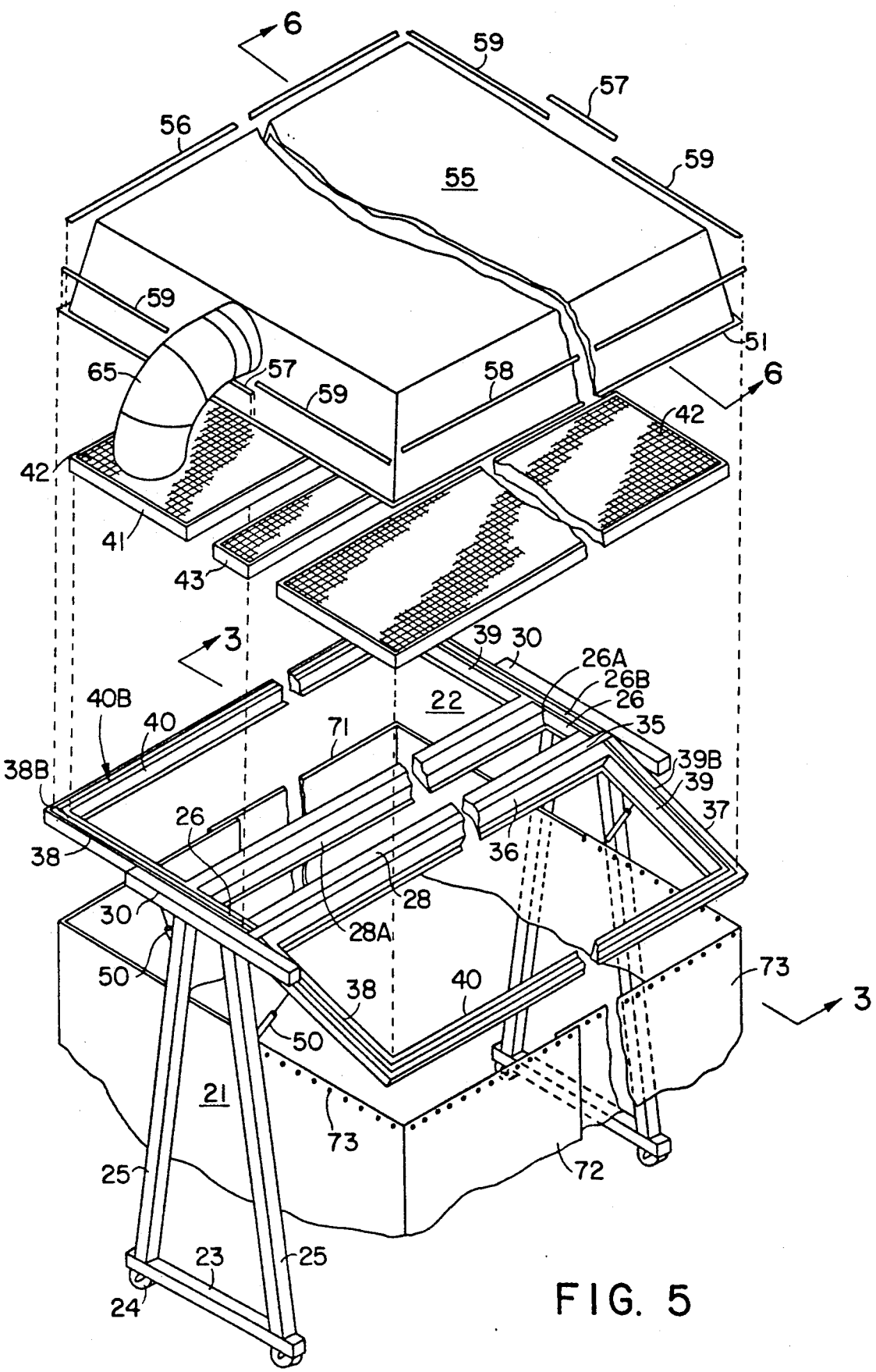
FIG. 5 is an exploded perspective view, enlarged, of the clean air enclosure of FIG. 1.
Figure 7:
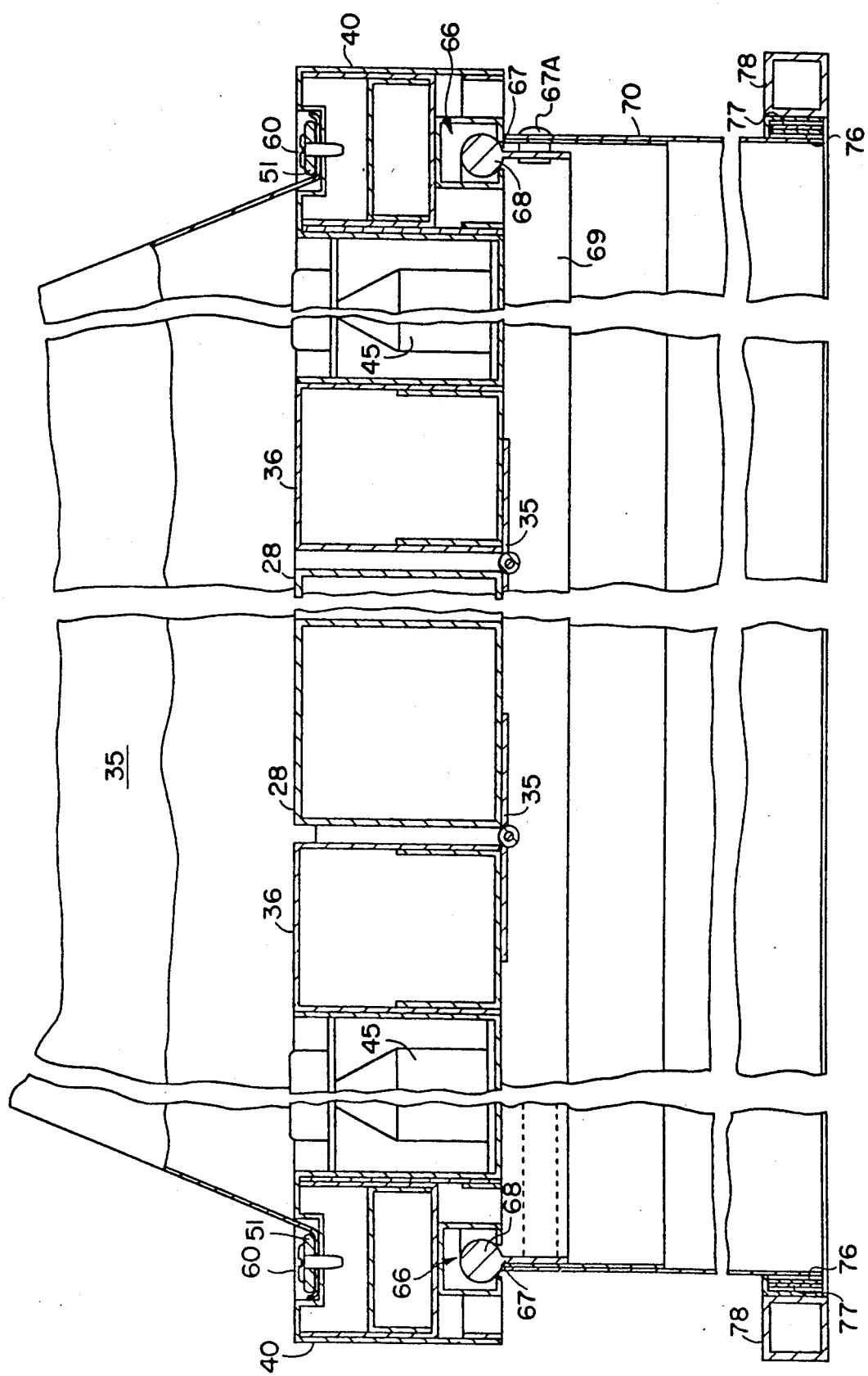
FIG. 7 is a view similar to FIG. 6 but illustrating more details of the clean air enclosure of the invention.

It should, of course, be understood that the description and drawings herein are merely illustrative, and that various modifications and changes can be made in the structure disclosed without departing from the spirit of the invention.

DESCRIPTION OF THE PREFERRED EMBODIMENT

Referring now more particularly to the drawings the clean air isolation enclosure as illustrated includes an outer curtain 10, and a source 12 of clean filtered air under pressure. The air source 12 is self contained in a cabinet 14, has castors 15 to rest on floor 18, and is designed to provide filtered air of minimum 99.97% efficiency @ 0.3 microns. The preferred air source 12 is available from Airo Clean Engineering, Inc., Exton, Pa. 19341, but other sources of clean air can be used as desired and dictated by the user's requirements. The enclosure includes two frame ends 21, joined together by a center section 22. The frame ends 21 each have a lower bar 23 with castors 24, which rest on the floor or other surface 18. The lower bar 23 has a pair of vertically extending converging members 25 connected thereto, and to an upper bar 26. The upper bars 26 of the frame ends 21 are connected together by parallel members 28 of the center section 22.

The upper bars 26, each have an additional horizontally oriented tube 30 connected thereto.

The center section members 28 each have a hinge 35 connected thereto, of well known type, such as a piano hinge, extending therealong, between and to the tubes 30.

The hinges 35 are also each connected to a member 36 which is part of a wing 37. The wings 37 are of rectangular configuration with side members 38 and 39 and connecting member 40.

The members 36, 38, 39 and 40 are of square configuration in cross section, with rims 36A, 38A, 39A and 40A to receive and retain a peripheral rim 41 from a perforated ceiling panel 42. The members 28 have rims 28A, and the members 26 have rims 26A to receive peripheral rim 43 from a panel 44. The panels 42 and 44 are preferably formed of clear acrylic plastic to permit light from fluorescent lights 45 to pass therethrough, and have a plurality of perforations 46 to distribute the filtered air uniformly. The lights are mounted to wings 37 above the panels 42 and 44, and are of well known type. The wings 37 each have a pair of pneumatic springs 50 connected thereto, and to members 25, to assist in raising and lowering the wings 37. The springs 50 are of well known type and available from Gas Spring Co. of Ambler, Pa. Latches 47 are provided on tubes 30, which extend into members 38 and 39 to retain the members in assembled condition. The members 26, 38, 39 and 40 have channels 26B, 38B, 39B and 40B to receive a peripheral rim 51 from a plenum 55. The rim 51 is retained in channels 26B, 38B, 39B and 40B by strips 56, 57, 58 and 59 with screws 60 extending therethrough into members 26, 38, 39 and 40.

It should be noted that the members 28, 36, 38, 39 and 40 are of square tubing, which is preferably of steel.

The plenum 55 is of rectangular dome shaped configuration, and preferably constructed of a well known lightweight fire retardant vinyl-nylon laminate that is both flexible and airtight.

A flexible air supply duct 65 connects the interior of the plenum 55 to the clean air source 12 to supply clean air to the interior of the plenum 55.

The members 38 and 40, and the bars 26 have a channel 66 extending around the periphery of the curtain 10, which channel 66 has a slot 67 at the bottom to receive a bead 68 from a mounting strip 69. The curtain 10 is a multi-part system which is attached to strip 69 by stiching, and includes four curtains 70, 71, 72 and 73 which overlap at their vertical meeting edges, with magnetic strips 74 and 75 to retain them together but which permit access to the interior as required. The curtains 70, 71, 72 and 73 extend down to the floor 18 and have thistle cloth strips 76 thereon, which engage complimentary thistle cloth strips 77 on a perimeter frame 78, which is bolted or otherwise fastened (not shown) to floor 18.

The curtains 70, 71, 72 and 73 are preferably of clear vinyl construction and are fire retardant.

The curtain 70 is provided with a bubble view port 80 of plastic, preferably polyvinylcloride, to permit personnel to view the interior of the enclosure as required. Below the bubble port 80 a plurality of glove like members 81 are provided, three being illustrated, and which permit personnel outside of the enclosure to perform procedures inside the enclosure without risking contamination to the inside. The glove members 81 can be of any suitable material, with flexible vinyl being particularly suitable. A bulkhead connector 85 is also provided, below view port 80 to allow for the connection of a stethoscope to be used in the enclosure without distorting the balance of air, or spreading contamination.

The air source 12 includes an outer cabinet 14 with a blower unit (not shown) therein and with a HEPA filter (not shown) of well known type. The cabinet 14 is provided with an upper variable louvred air outlet 91, and a lower variable louvred air intake 92. An air intake duct 93 is provided, which communicates with the interior of the enclosure, and with the cabinet 14. A damper 94 is provided, to change the pressure of the enclosure to either positive or negative. The air source 12 is also provided with an air pressure gage 95 of well known type to monitor the pressure inside of curtain 10, and an air flow gage 96 to monitor the rate of airflow out of the perforated ceiling panels 42 and 44.

If the enclosure is to be used in a hospital environment, a bed 100 and other items (not shown) may be placed in the enclosure.

The mode of operation and use will now be pointed out. When it is desired to establish a clean room isolation environment the clean air source 12 can be moved on its castors 14 to the desired location and connected to a power source (not shown). A bed 100 and other items (not shown) are placed in the location and the frame 78 is installed.

The enclosure with the wings 37 in collapsed, down position can be moved on its castors 24 to the desired location.

Duct 65 is connected to the clean air source 12, and wings 37 are swung to their uppermost horizontal position, and locked by latches 47 of tubes 30, which extend into members 38 and 39.

The bead 68 from strip 69 is slid into slot 67 and curtains 70, 71, 72 and 73 are moved around the outside of the enclosure to form a closed space, wherein the clean environment is to be provided. If positive pressure is desired, intake 92 is opened, and outlet 91 is closed. If negative pressure is desired outlet 91 is opened and intake 92 closed. The air source 12 is activated and clean air fills and inflates plenum 55, and then flows downwardly through the perforations 46 in panels 42 and 44 into the space within formed by curtains 70, 71, 72 and 73.

The curtains 70, 71, 72 and 73 have their strips 76 engaged with strips 77 on frame 78. If entry to or exit from the inside of the enclosure is desired, the curtains are easily parted for entry or exit, along vertical strips 74 and 75.

Likewise viewing of the interior of the enclosure is available through bubble port 80, and access for procedures is available through glove members 81. It will thus be seen that structure has been provided with which the objects of the invention are attained.

I claim:

1. Portable clean air enclosure providing a contaminant free environment within a room and adapted to be connected to a source of clean air comprising:
   a pair of spaced apart upstanding frame members;
   a generally rectangular center section connecting the frame members at their upper ends;
   horizontal wing support members mounted on the upper end of each of the frame members and extending outwardly beyond either side of the center section;
   a pair of wing members hingedly connected to opposing side edge portions of said center section actuatable from a downwardly depending retracted position to an upper position aligned with the support members;
   releasable latching means operatively associated with the support members for securing the wing members in the upper limit position; and
   curtain means attached to said wing members and said center section and depending downwardly therefrom forming therewith an isolation enclosure.

2. A portable clean air enclosure as claimed in claim 1 wherein the frame members are A-shaped.

3. A portable clean air enclosure as claimed in claim 1 including a plenum mounted on said center section and said wing members, a duct connecting said air source and said plenum;
   a plurality of perforated ceiling panels mounted to said wings and said center section in connection with said plenum;
   perimeter frame means on said floor around the bottom of said enclosure; and
   attachment means on said curtains and attachment means on said perimeter frame members to connect said curtains thereto and to seal off said enclosure.

4. A portable clean air enclosure as defined in claim 3 in which at least one light source is provided and mounted within said plenum above said panels.

5. A portable clean air enclosure as defined in claim 1 in which said wing members have pneumatic spring means to assist in rotation and support of said wing members.

6. A portable clean air enclosure as defined in claim 1 in which said source of clean air has adjustable louvered air intake and exhaust means to control the flow of air therethrough;
   air intake duct means is connected to said enclosure and to said source; and
   damper means is provided to control the flow of air therethrough, whereby the pressure of the air in said enclosure can be positive or negative.

* * * * *